US012609041B2

(12) United States Patent
O'Donnell

(10) Patent No.: US 12,609,041 B2
(45) Date of Patent: Apr. 21, 2026

(54) APPARATUS AND METHOD FOR RECURSIVE USE OF ARTICLES IN PERFORMANCE OF ACTIVITIES

(71) Applicant: Rosanne O'Donnell, Marshfield, MA (US)

(72) Inventor: Rosanne O'Donnell, Marshfield, MA (US)

( * ) Notice: Subject to any disclaimer, the term of this patent is extended or adjusted under 35 U.S.C. 154(b) by 440 days.

(21) Appl. No.: 18/139,375

(22) Filed: Apr. 26, 2023

(65) Prior Publication Data

US 2023/0368685 A1    Nov. 16, 2023

Related U.S. Application Data

(60) Provisional application No. 63/335,354, filed on Apr. 27, 2022.

(51) Int. Cl.
*G09B 3/04*      (2006.01)
*B42D 1/00*      (2006.01)
(52) U.S. Cl.
CPC ............... *G09B 3/04* (2013.01); *B42D 1/008* (2013.01); *B42D 1/009* (2013.01)

(58) Field of Classification Search
CPC ... G09B 7/04; G09B 3/04; B42D 1/00; B42D 1/08; B42D 1/009
See application file for complete search history.

(56) References Cited

U.S. PATENT DOCUMENTS

| | | | | |
|---|---|---|---|---|
| 5,447,439 A | * | 9/1995 | Nathanson | ............. G09B 17/00 434/405 |
| 6,116,603 A | * | 9/2000 | Huang | .................. A63F 3/0415 273/272 |
| 2007/0029729 A1 | * | 2/2007 | Baker | .................... A63H 33/38 273/285 |
| 2013/0273510 A1 | * | 10/2013 | Cooper | .................. G09B 11/00 434/162 |

OTHER PUBLICATIONS

Tiny Feats , "White Board—Dry Erase Quiet Book Page by TinyFeats", Jun. 13, 2020, Youtube.com, pp. 1-5, at https://www.youtube.com/watch?v=3WjAJcUbq1c (last visited Sep. 4, 2025) (Year: 2020).*

* cited by examiner

*Primary Examiner* — Steve Rowland
(74) *Attorney, Agent, or Firm* — POLSINELLI PC

(57) ABSTRACT
The present invention relates to a set of graphical display items and articles that collectively provide for the recursive performance of a variety of hands-on games or activities by a user.

10 Claims, 5 Drawing Sheets a) Selecting one of the graphical display items (15)

b) Selecting one or more of the hands on articles (20) from the plurality of differently shaped, colored and/or numbered hands on articles (20) to perform the defined activity of the selected display item

c) Performing the defined activity utilizing the selected articles (20), wherein the step of performing includes writing on defined areas of the clear reusable plastic sheet (30) positioned over the top surface of the selected display item (15) to perform the defined activity

d) Recursively performing steps a) through c) with the same or different selected display items (15) and the same or different selected articles (20)

Fig. 1B

APPARATUS AND METHOD FOR RECURSIVE USE OF ARTICLES IN PERFORMANCE OF ACTIVITIES

FIELD OF THE INVENTION

The present invention relates to a set of graphical display items and articles that collectively provide for the recursive performance of a variety of hands-on games or activities by a user.

SUMMARY OF THE INVENTION

An apparatus (10) comprising:

a player book (12) comprising a collection of graphical display items (15) on different pages (13) of the book each relating to a different practice session that requires a different defined hands-on manipulative activity by the user, a set of differently shaped, colored and/or numbered manipulative hands-on articles (20) adapted for use in performing one or more of the defined activities by the user, a clear write-on/write-off reusable plastic sheet (30) positionable over the top surface of each page (13) and display item (15) of the book, a marker (32) and eraser (33) for writing on the reusable plastic sheet (30) and subsequently erasing the writing on the reusable plastic sheet to enable recursive use of the sheet by the user to write on the sheet while positioned over a top surface of a page (13) having a selected one of the graphical display items (15) and to perform the same or different defined activities of the different practice sessions while the sheet is positioned over each of the selected graphical display items (15).

In one embodiment of the invention, the set of differently shaped, colored and/or numbered articles (20) comprises two or more of:

cards;
counters;
dice;
shapes;
blocks;
cubes; and
counting frames.

In one embodiment of the invention, the player book has a bound edge (14) and is configured to open to display each page (13) with the selected graphical display item (15).

In one embodiment of the invention, each graphical display item has a different set of entry boxes or selection items for the user to elect by writing on the reusable plastic sheet in an area over the respective entry box or selection item.

In one embodiment of the invention, the set of entry boxes or selection items are configured for entry of a number, shape and/or written text.

In one embodiment of the invention, the graphical display items each identify a different construction project exemplifying a mathematical function suitable for understanding by a player in a selected age group; and the plurality of different shaped, colored and/or numbered articles are adapted for assembly into a variety of different configurations to complete one or more of the different construction projects.

In one embodiment of the invention, a method is provided wherein steps by the user include:

a) selecting one of the graphical display items (15);

b) selecting one or more of the hands on articles (20) from the plurality of differently shaped, colored and/or numbered hands on articles (20) to perform the defined activity of the selected display item;

c) performing the defined activity utilizing the selected articles (20), wherein the step of performing includes writing on defined areas of the clear reusable plastic sheet (30) positioned over the top surface of the selected display item (15) to perform the defined activity;

d) recursively performing steps a) through c) with the same or different selected display items (15) and the same or different selected articles (20) (see FIG. 1B).

In one embodiment of the invention, the method includes presenting the writing on the clear reusable plastic sheet to a reviewer to assess whether the writing conforms to the defined activity.

In one embodiment of the invention, the method includes steps of:

assembling the selected articles on the clear reusable plastic sheet positioned on the top surface of the selected display item in one of the variety of different configurations to perform the construction project identified on the selected display item.

In one embodiment of the invention, the method includes presenting the completed construction project to a reviewer to assess whether the completed construction project conforms to the construction project identified on the display item.

In one embodiment of the invention, the method includes subsequently disassembling the completed construction project and recursively performing the construction projects defined by the same of different display items with the same or different articles.

BRIEF DESCRIPTION OF THE DRAWINGS

FIG. 1B shows the method of a) selecting one of the graphical display items (15); b) selecting one or more of the hands on articles (20) from the plurality of differently shaped, colored and/or numbered hands on articles (20) to perform the defined activity of the selected display item; c) performing the defined activity utilizing the selected articles (20), wherein the step of performing includes writing on defined areas of the clear reusable plastic sheet (30) positioned over the top surface of the selected display item (15) to perform the defined activity; and d) recursively performing steps a)

through c) with the same or different selected display items (15) and the same or different selected articles (20).

Figure 1:
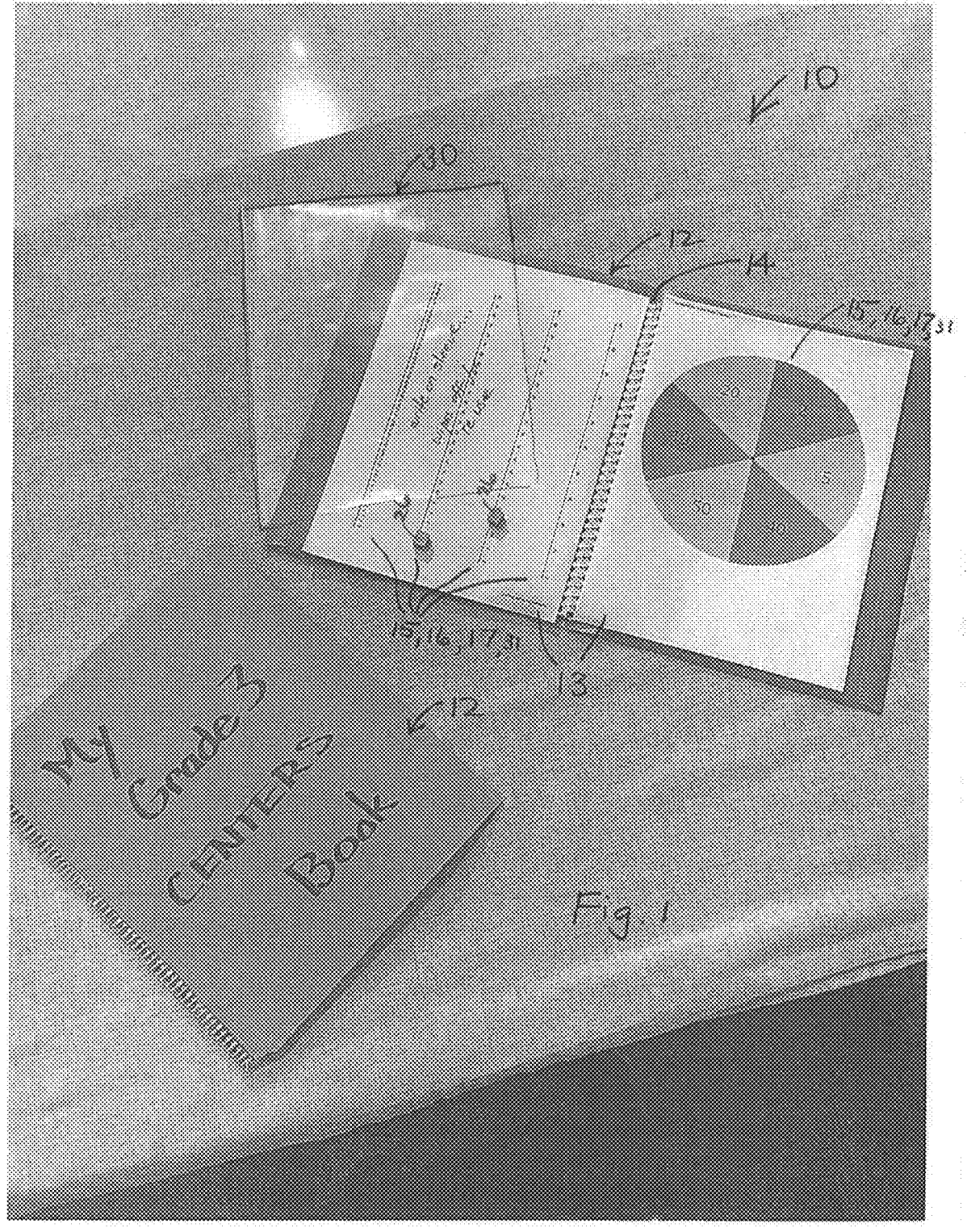
FIG. 1 illustrates, according to one embodiment of the invention, an apparatus (10) including a sample spiral bound (14) user player book (12) containing a plurality of activity pages (13) that lie flat containing the hands-on games, also referred to as activities, defined for a particular set of users, here identified as My Grade 3 Centers Book (one such book to be assigned to each user in the particular set of users). The book includes a plurality of graphical display items (15), including entry boxes or selection items (15, 16, 17, and 31), each on one or more of a respective page or sheet (13) of the book (12). Also provided for each activity, on the same or a different page or sheet, are, for example, directions (42), gameboard(s) (43), spinner (44), recording sheets (45), etc. Also provided to each assigned user is a clear plastic write-on/wipe-off sheet or sleeve (30).
Figure 1A:
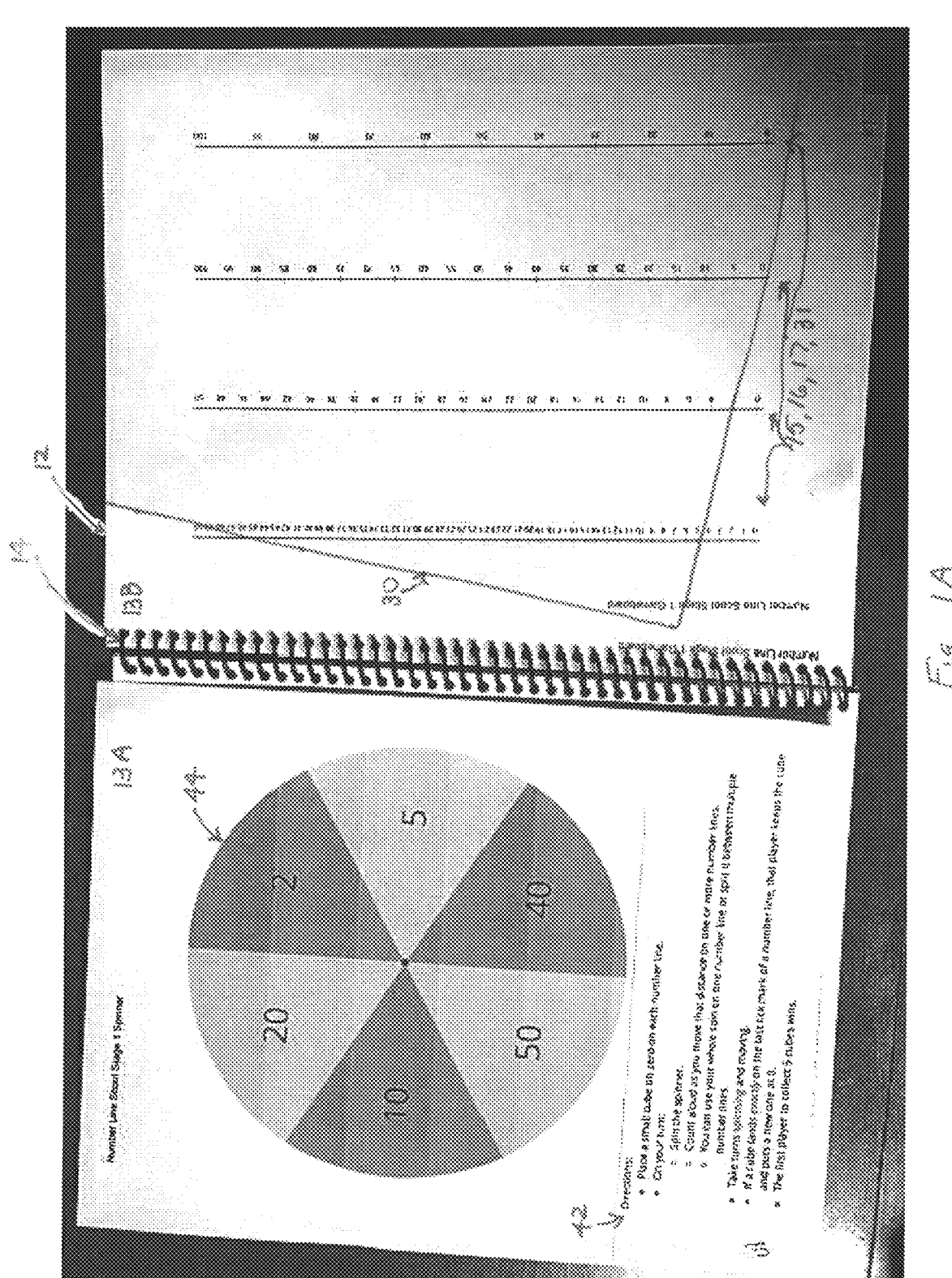
FIG. 1A shows the same two facing open pages 13A, 13B that lie flat, adjacent to one another, with directions (42) and spinner (44) on page 13A of the gameboard. Cubes (26) are shown in FIG. 1 for users performing the activity per the directions (42).
Figure 2:

FIG. 2 illustrates, according to one embodiment, a set of articles to accompany the book of FIG. 1, wherein each user of the particular set of users is also assigned their own such set of game pieces or articles. The articles shown here include, for example, articles useful in performing the hands-on games defined in the book of FIG. 1, such as decks of cards (21), counters (22), dice (23), shapes (24), blocks (25), etc. Also provided to each user are one or more markers (32), for writing on the clear plastic write-on/wipe-off sheet (30), including one or more erasers (33) used to wipe off the sheet (30) (remove the user's prior writings on the sheet (30)).

Figure 3:
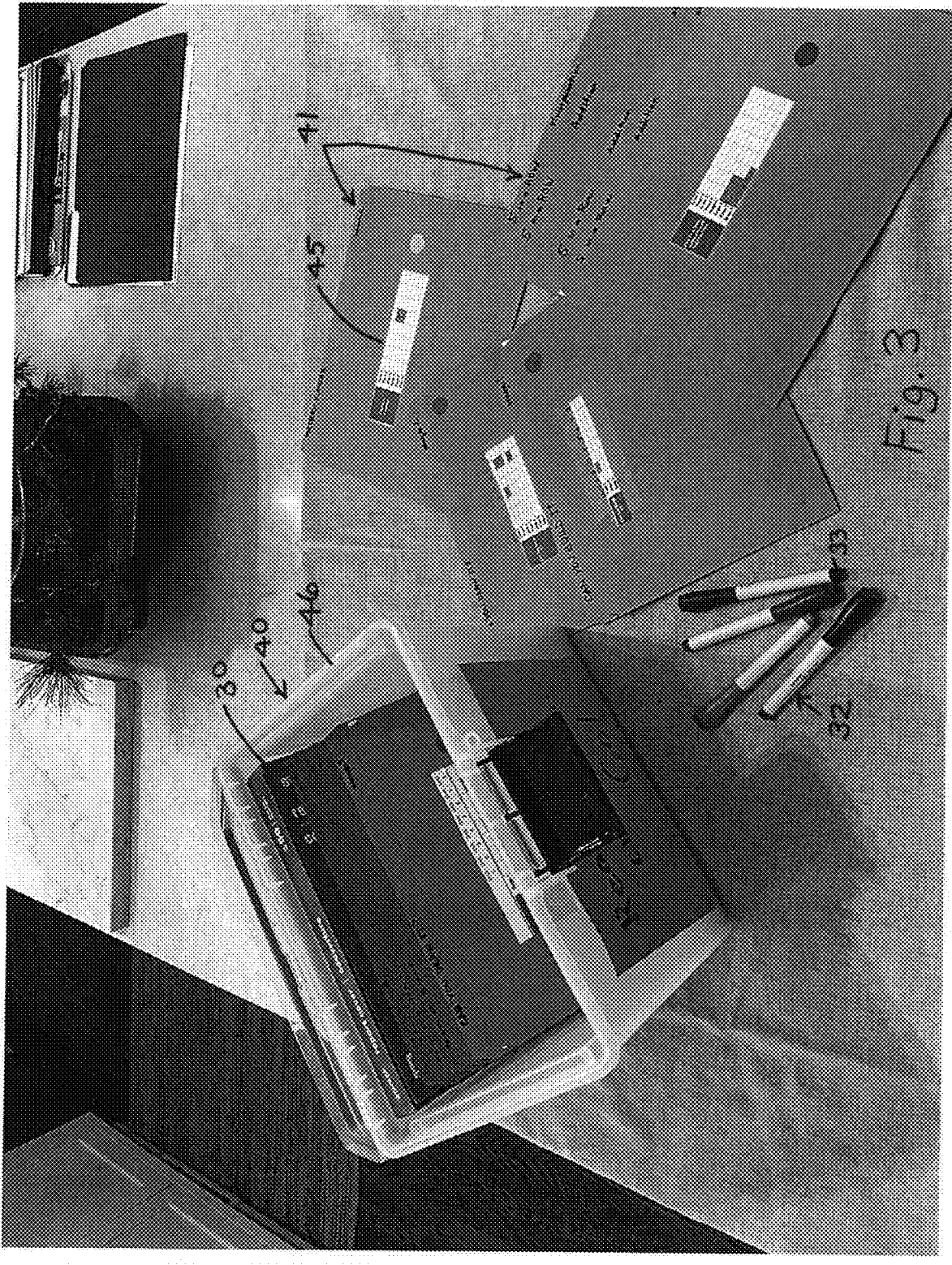

FIG. 3 illustrates a reviewer's set of articles (40), here including a file box or container (46) holding a plurality of file folders (41), each file folder containing or including written materials that define each game or activity. The reviewer's set of articles also include monitoring forms or recording sheets (45) (for recording the completed activities of each user, e.g., in a separate form or different areas of one form), enabling the reviewer to monitor and track each user's completion of the hand-on activities and games. The reviewer's set of articles may further include extra plastic sheets (30) and dry erase markers/erasers (32, 33) for distribution to users.

BACKGROUND AND DETAILED DESCRIPTION

In accordance with one embodiment of the invention there is provided a set of elementary classroom hands-on manipulative math materials in a unique format and configuration designed to support the hands-on learning games and activities (also referred to as CENTERS) that are required in a lesson plan of the curriculum called "Illustrative Mathematics (IM)". For example, IM is a free and open education resource (OER) curriculum available online. The curriculum lesson plans intentionally include a list of CENTERS (hands-on physical games and activities that users perform repeatedly perform) for students to engage in, at each grade level K-5, on an on-going basis. The CENTERS are an integral component that gives students the opportunity to practice and apply skills and concepts (after teacher instruction) to achieve fluency and accuracy. Each book and set of articles comprise a physical station (locale) at which the user can perform such games or activities.

The guidance in the teacher's lesson plans recommends that students use each of these centers, repeatedly, over a defined period of time (e.g., the course of a year)—either by being assigned to them by the teacher based on need, or by student choice. Centers are also designed for partners and small groups (i.e., for use by two or more users, each having their own book and set of articles, same as the other users), and which can be used by teachers to address remediation, provide practice and/or challenge, as well as to observe/obtain informal assessment data.

As an online resource, IM (and their two licensed publishers) provide the teachers and students with Center directions and printable masters for "hand-outs" to students with game boards and recording sheets. To accompany these handouts, the IM curriculum assumes the teacher will provide "hands on" manipulatives (game pieces, card decks, shapes, blocks, dice, etc.). Therefore, as currently configured and provided as a free OER, the curriculum (or teaching process) requires a great deal of photocopying, no specific method for distribution or management, and many, hours of teacher preparation throughout the year. Because of this unreasonable "ask" of teachers, (to be the on-going source of centers, photocopies, manipulatives, management, etc.), teachers are not including Center time in their lessons at all and students are missing an essential opportunity for practice and application to achieve math fluency and conceptual understanding.

In order to solve the problems presented by the prior Centers, the format and configuration of the present invention provides a ready-to-use, non-consumable format (solution) whereby every student has individual access to every center in a Student Book of Centers. Along with the book is a plastic write-on/wipe-off sheet or sleeve and a dry-erase marker which will allow the student to re-use each Center over-and-over. Likewise, every student receives their own individual set of game pieces (card decks, dice, blocks, shapes, etc.) in a small plastic container. The individual student book and individual set of articles (game pieces) also allows the student to 'own' their own Centers for home use, as well.

Teachers receive a container (e.g., a plastic tote) with a copy of every Center in a separate file folder—organized, cross-referenced, and labeled by math learning standard—for easy access, additional replacements, and management. The teacher tote also includes extra write on/wipe off sleeves and extra dry-erase makers.

| What the invention provides (in one embodiment): | | |
| --- | --- | --- |
| Player Book | Reviewer Instruction and Monitoring Tools | Player Articles (Set) (Varies by player level) |
| A spiral bound book with a plurality of pages that will lie flat on a writing surface (for temporarily positioning a clear plastic write-on/write-off sheet over each page) defining a complete set of hands-on games or activities for a defined set of users/players, the pages including graphical display items with entry boxes and selection items for performing one or more of the defined activities Write on/wipe off plastic sheet or sleeve, temporarily positionable over each page of the book, enabling the user to assemble the articles and/or elect by writing on the sheet in a defined area over a respective entry box or selection item in order to perform a defined activity Dry erase marker with eraser | File folders with instructions for each hands-on game or activity in a set Player Monitoring and Recording forms Extra Plastic sleeves Extra dry erase markers | Decks of special cards Counters Dice Shapes Place value block Cm cubes Counting frames Etc . . . (as outlined in the defined set of activities) |

LEGEND OF COMPONENTS AND REFERENCES NUMBERS

10 Apparatus
12 User Player book

13 Activity pages
14 Bound edge
15 Graphical display items
16 Entry boxes or selection items
17 Number, shape and/or written text
20 Player Set of articles (game pieces)
21 Cards
22 Counters
23 Dice
24 Shapes
Blocks
26 Cubes
27 Counting frames
28 Assembly
30 Player clear plastic write on/wipe off cover sheet (e.g., dry erase)
31 Defined areas
32 Player marker (e.g., dry erase)
33 Player eraser (e.g., dry erase)
40 Reviewer set of articles
41 Reviewer file folders and player monitoring forms
42 Directions
43 Gameboard
44 Spinner
45 Recording Sheet
46 File Box

The invention claimed is:

1. An apparatus comprising:

a player book comprising a collection of graphical display items on different pages of the book each relating to a different practice session that requires a different defined hands-on manipulative activity by the user, a set of differently shaped, colored and/or numbered manipulative hands-on articles adapted for use in performing one or more of the defined activities by the user, a clear write-on/write-off reusable plastic sheet positionable over the top surface of each page and display item of the book, a marker and eraser for writing on the reusable plastic sheet and subsequently erasing the writing on the reusable plastic sheet to enable recursive use of the sheet by the user to write on the sheet while positioned over a top surface of a page having a selected one of the graphical display items and to perform the same or different defined activities of the different practice sessions while the sheet is positioned over each of the selected graphical display items, wherein the set of differently shaped, colored and/or numbered articles comprises two or more of:

cards;

counters;

dice;

shapes;

blocks;

cubes; and counting frames.

2. The apparatus of claim 1, wherein the player book has a bound edge and is configured to open to display each page with the selected graphical display item.

3. The apparatus of claim 1, wherein each graphical display item has a different set of entry boxes or selection items for the user to elect by writing on the reusable plastic sheet in an area over the respective entry box or selection item.

4. The apparatus of claim 3, wherein the set of entry boxes or selection items are configured for entry of a number, shape and/or written text.

5. An apparatus comprising:

a player book comprising a collection of graphical display items on different pages of the book each relating to a different practice session that requires a different defined hands-on manipulative activity by the user, a set of differently shaped, colored and/or numbered manipulative hands-on articles adapted for use in performing one or more of the defined activities by the user, a clear write-on/write-off reusable plastic sheet positionable over the top surface of each page and display item of the book, a marker and eraser for writing on the reusable plastic sheet and subsequently erasing the writing on the reusable plastic sheet to enable recursive use of the sheet by the user to write on the sheet while positioned over a top surface of a page having a selected one of the graphical display items and to perform the same or different defined activities of the different practice sessions while the sheet is positioned over each of the selected graphical display items, wherein;

the graphical display items each identify a different construction project exemplifying a mathematical function suitable for understanding by a player in a selected age group; and the plurality of different shaped, colored and/or numbered articles are adapted for assembly into a variety of different configurations to complete one or more of the different construction projects.

6. A method, using an apparatus comprising:

a player book comprising a collection of graphical display items on different pages of the book each relating to a different practice session that requires a different defined hands-on manipulative activity by the user, a set of differently shaped, colored and/or numbered manipulative hands-on articles adapted for use in performing one or more of the defined activities by the user, a clear write-on/write-off reusable plastic sheet positionable over the top surface of each page and display item of the book, a marker and eraser for writing on the reusable plastic sheet and subsequently erasing the writing on the reusable plastic sheet to enable recursive use of the sheet by the user to write on the sheet while positioned over a top surface of a page having a selected one of the graphical display items and to perform the same or different defined activities of the different practice sessions while the sheet is positioned over each of the selected graphical display items, comprising steps by the user of:

a) selecting one of the graphical display items;

b) selecting one or more of the articles from the plurality of differently shaped, colored and/or numbered articles to perform the defined activity of the selected display item;

c) performing the defined activity utilizing the selected articles, wherein the step of performing includes writing on defined areas of the clear reusable plastic sheet positioned over the top surface of the selected display item to perform the defined activity;

d) recursively performing steps a) through c) with the same or different selected display items and the same or different selected articles.

7. The method of claim 6, including:

presenting the writing on the clear reusable plastic sheet to a reviewer to assess whether the writing conforms to the defined activity.

8. The method of claim 6 with the apparatus of claim 5, including steps of:

assembling the selected articles on the clear reusable plastic sheet positioned on the top surface of the selected display item in one of the variety of different configurations to perform the construction project identified on the selected display item.

9. The method of claim 8, including:

presenting the completed construction project to a reviewer to assess whether the completed construction project conforms to the construction project identified on the display item.

10. The method of claim 9, including:

subsequently disassembling the completed construction project and recursively performing the construction projects defined by the same of different display items with the same or different articles.

\* \* \* \* \*